(12) United States Patent
Bourke, III et al.

(10) Patent No.: US 11,212,879 B2
(45) Date of Patent: Dec. 28, 2021

(54) TEMPERATURE MEASUREMENT SYSTEM EMPLOYING AN ELECTROMAGNETIC TRANSPONDER AND SEPARATE IMPEDANCE-CHANGING PARASITIC ANTENNA

(71) Applicant: TSI Technologies LLC, Wichita, KS (US)

(72) Inventors: Michael J. Bourke, III, Brighton, MI (US); Brian L. Clothier, Wichita, KS (US)

(73) Assignee: TSI Technologies LLC, Wichita, KS (US)

( * ) Notice: Subject to any disclaimer, the term of this patent is extended or adjusted under 35 U.S.C. 154(b) by 331 days.

(21) Appl. No.: 16/257,175

(22) Filed: Jan. 25, 2019

(65) Prior Publication Data

US 2019/0159298 A1     May 23, 2019

Related U.S. Application Data

(62) Division of application No. 15/070,964, filed on Mar. 15, 2016, now Pat. No. 10,225,890.

(Continued)

(51) Int. Cl.
*H05B 6/06*     (2006.01)
*G01K 1/024*     (2021.01)
(Continued)

(52) U.S. Cl.
CPC ............. *H05B 6/062* (2013.01); *G01K 1/024* (2013.01); *G01K 7/36* (2013.01); *H05B 6/105* (2013.01);
(Continued)

(58) Field of Classification Search
CPC ...... H05B 6/062; H05B 6/105; H05B 6/1209; H05B 2213/06; H05B 2213/07
(Continued)

(56) References Cited

U.S. PATENT DOCUMENTS 3,742,178 A * 6/1973 Harnden, Jr. .......... A47J 27/002
219/627
3,742,179 A * 6/1973 Harnden, Jr. .......... H05B 6/062
219/627

(Continued)

FOREIGN PATENT DOCUMENTS

DE     202009018612 U1     10/2012

OTHER PUBLICATIONS

International Search Report and Written Opinion dated Jun. 15, 2016 in PCT/US2016/022706.

(Continued)

*Primary Examiner* — Thien S Tran
(74) *Attorney, Agent, or Firm* — Hovey Williams LLP; Scott R. Brown

(57) ABSTRACT

Temperature measurement systems (20) include a temperature sensor (22) and an electronic signal interrogator (24). The temperature sensor (22) has a transponder (26) equipped with an antenna (28), and a separate parasitic antenna (32) with a temperature-sensitive transducer (34, 68-74, 78*a*-84*a*), while the interrogator (24) has a transmitter (42) and antenna (40). The sensor (22) is designed to be placed in thermal contact with an object to be temperature-measured, with the interrogator (24) placed in proximity to the object. The systems (20) may be used with food servingware domes (88, 114), which can be preheated and placed over a food-bearing plate to maintain the temperature of the food.

15 Claims, 5 Drawing Sheets

Related U.S. Application Data

(60) Provisional application No. 62/134,246, filed on Mar. 17, 2015.

(51) Int. Cl.
  *G01K 7/36* (2006.01)
  *H05B 6/12* (2006.01)
  *H05B 6/10* (2006.01)

(52) U.S. Cl.
  CPC ....... H05B 6/1209 (2013.01); *H05B 2213/06* (2013.01); *H05B 2213/07* (2013.01)

(58) Field of Classification Search
  USPC ........................................ 219/488, 626, 627
  See application file for complete search history.

(56) References Cited

U.S. PATENT DOCUMENTS

| | | | |
|---|---|---|---|
| 4,880,951 A | 11/1989 | Levinson | |
| 5,951,900 A * | 9/1999 | Smrke | A47J 36/321 219/497 |
| 6,172,608 B1 * | 1/2001 | Cole | H04B 5/0012 340/572.1 |
| 6,320,169 B1 | 11/2001 | Clothier | |
| 6,953,919 B2 | 10/2005 | Clothier | |
| 2007/0152828 A1 * | 7/2007 | Mohalik | G06K 19/07345 340/572.3 |
| 2012/0132642 A1 * | 5/2012 | Broders | G05D 23/1902 219/488 |
| 2012/0152932 A1 * | 6/2012 | Moon | H05B 6/1209 219/601 |
| 2014/0098835 A1 * | 4/2014 | Herzog | G01K 11/265 374/117 |
| 2014/0121557 A1 | 5/2014 | Gannon et al. | |

OTHER PUBLICATIONS

European Search Report dated Sep. 13, 2018 in EP Application No. 16765678.1.

* cited by examiner

TEMPERATURE MEASUREMENT SYSTEM EMPLOYING AN ELECTROMAGNETIC TRANSPONDER AND SEPARATE IMPEDANCE-CHANGING PARASITIC ANTENNA

CROSS-REFERENCE TO RELATED APPLICATION

This application is a division of identically-titled U.S. application Ser. No. 15/070,964 filed Mar. 15, 2016, which claims the benefit of identically-titled provisional application Ser. No. 62/134,246, filed Mar. 17, 2015, each of which is incorporated by reference herein in its entirety.

BACKGROUND OF THE INVENTION

Field of the Invention

The present invention is broadly concerned with temperature sensors and temperature measurement systems permitting wireless temperature measurement of various objects during heating or cooling thereof. More particularly, the invention is concerned with such sensor and systems, and especially those designed for heating of food servingware, such as food plate domes. The sensors include a transponder and a proximal parasitic antenna, the latter having a temperature-sensitive transducer operable to change the impedance value of the parasitic antenna when the object being temperature-sensed reaches a predetermined temperature for transducer operation.

Description of the Prior Art

Remote, wireless temperature measurement systems employing identification technologies exist in the prior art, see U.S. Pat. No. 6,320,169, which is incorporated by reference herein in its entirety. The '169 patent describes Radio Frequency Identification (RFID) labels or tags physically connected to one or more thermal switches, where the thermal switch(es) are in contact with an object whose temperature is to be remotely measured. Interrogating electromagnetic signals are generated, which are received by the RFID tag, which in turn generates reply signals. However, when the object temperature reaches or exceeds a pre-set temperature, the thermal switch(es) disconnect the RFID antenna so that no reply signals are generated. This is interpreted by the system as a condition where the object has reached or exceeded the pre-set temperature.

There are several disadvantages with the tag/switch combination and associated measurement system of the '169 patent. First, the tag/switch combination is difficult to incorporate within an object whose temperature is to be measured. The physical connection between the tags and switches is inherently delicate, making use of fine connection wires and connectors soldered or affixed to the tag. As such, it is very difficult to injection mold such a tag/switch combination within an object. Second, if the connection between the switch and tag is short in length so as to facilitate manufacturing, the tag may be too close to the object to be measured to allow for good communication with the tag, owing to antenna de-tuning by the object, especially if the object is made from an electrically conducting material. Conversely, if the connections are lengthened so as to enhance communications by eliminating any adverse effects from the object, the difficulty of incorporation into the object increases. Third, the fact that the tag is connected to the switch means that thermal energy from the object in contact with the switch will conduct or radiate to the tag, either through the connecting leads or simply by conduction through adjacent matter. Thus, should the tag/switch combination be used to measure high object temperatures, the integrated circuitry of the tag may be destroyed or tag communication may be disrupted.

Therefore, it would be a decided advantage to provide a remote temperature measurement system whose label or tag can be thermally insulated from the object whose temperature is to be measured. In such a case, object temperatures can be measured which well exceed the label's rated operating temperature. Moreover, labels or tags having integrated circuits and extensive memory storage can be employed, allowing storage and update of digital information on the associated labels or tags. This storage and updating of digital information at high operating temperatures allows additional features beyond simple temperature measurement, such as storage of heating instructions, point-of-sale information, and more.

It would also be advantageous to provide remote temperature measurement systems having labels or tags physically separate from any required temperature sensor or thermal switch, thereby eliminating the delicate tag/switch connections of the prior art. Separate labels or tags could be easily incorporated into an object so that the electromagnetic coupling between the labels or tags and an interrogator (e.g., an RFID reader) is not compromised by the adjacent object material.

U.S. Pat. No. 6,172,608, incorporated by reference herein in its entirety, discloses an enhanced range transponder system including a transponder label electromagnetically coupled to a parasitic antenna, the latter being simultaneously electromagnetically coupled to the interrogator. However, the transponder system of the '608 patent is not designed to measure object temperatures, either at single or multiple temperature measurement locations on an object.

SUMMARY OF THE INVENTION

The present invention overcomes the problems outlined above and provides enhanced wireless temperature sensor systems usable with a wide variety of objects to be temperature-measured, and particularly food servingware. Generally, the invention provides wireless temperature sensors, temperature measurement systems including the sensors, and food servingware items, such as plate domes, which incorporate the temperature sensors. The invention eliminates the need for a physical or wired connection between labels or tags and temperature-sensitive switches typical of prior art sensor systems.

The wireless temperature sensors of the invention are configured for attachment to an object in order to sense the temperature of the object and broadly comprise a transponder including a transponder antenna and a circuit operably coupled with the transponder antenna, the circuit operable to extract energy from electromagnetic signals received by the transponder antenna, and to generate transponder reply signals containing reply information. The sensors further include a parasitic antenna having an impedance value and operable to be excited by electromagnetic signals including the transponder reply signals in order to generate parasitic antenna reply signals, which include the reply information. The transponder antenna and parasitic antenna are in proximity and are electromagnetically coupled by mutual inductance when the electromagnetic signals are received. Importantly, the parasitic antenna includes a temperature-sensitive transducer operable to change the impedance value of the parasitic antenna in the event that the object reaches a predetermined temperature, to thereby change a detectable parameter of at least one or both of the transponder reply signals and the parasitic antenna reply signals.

In normal practice, the sensors of the invention are designed so that the relative positions of the transponder and parasitic antenna are fixed. This can be achieved by mounting these components on a substrate, such as a rigid insulating material commonly used for the production of printed electronic circuit boards (e.g., FR-4), but could also be in the form of flexible materials, such as Kapton® or Mylar®. The chosen substrate material should be electrically insulating and capable of withstanding the temperatures to which the associated object will be subjected. In alternate forms, the transponder and parasitic antenna can be separately mounted on or in the object to be temperature-measured; advantageously, these components are separated by thermal insulating materials. In either case, the temperature sensors of the invention can be easily integrated into the objects, even via injection molding.

Preferably, the transducer is selected from the group consisting of temperature-sensitive switches, electrically conductive traces formed of positive temperature coefficient ink, and combinations thereof. The parasitic antenna may also include one or more transducers, as desired.

Complete temperature measurement systems include the temperature sensors in combination with an interrogator operable to generate the necessary electronic signals received by the transponder and antenna. The most preferred is an RFID reader or reader/writer, which is mated with the corresponding RFID tag. The interrogator is strategically placed relative to the sensor to give the proper operational characteristics to the systems.

One embodiment of the invention is in the form of a food servingware heatable dome, such as used in institutional food settings. The domes are preheated and are placed over a food-bearing plate in order to maintain the food at a desired heated temperature during transport and before consumption of the food. Such domes in accordance with the invention typically include a dome body presenting a central section and a peripheral skirt depending from the central section. The central sections of the domes have an induction-heatable component and a temperature sensor of the type previously described, which is actuated by means of an interrogator. The induction-heatable component may include a matrix having a plurality of induction-heatable layers sandwiched between alternating layers of heat-retentive material, which are well known in the art. Alternately, the component may be formed of ferromagnetic metal. In use, the dome is placed in proximity to an appropriate interrogator, and is heated to a predetermined temperature, as described above.

Heating of the dome is advantageously carried out using a specifically designed induction heater. The heater includes an upstanding cylindrical housing having a circular sidewall and a top wall, and a work coil within the cylindrical housing. The work coil is operable, with the usual components of an induction heater such as an inverter and control circuitry, to generate an alternating magnetic field, which heats the dome's induction-heatable component. The induction heater housing is dimensioned so that the central section of the dome can be placed directly on the top wall of the housing, with the depending skirt preventing any substantial lateral movement of the dome. Moreover, the work coil of the heater is directly below the induction-heatable component of the dome, thereby assuring rapid heating of the dome. Once the dome reaches the desired predetermined temperature, it is removed and placed over a food-bearing plate, and a new dome is then positioned on the heater housing. Preferably, the housing also includes the system interrogator in the form of an RFID reader or reader/writer, as well as at least one upstanding interrogator antenna. Use of two or more such antennas assures that the dome will be heated notwithstanding the rotational position of the dome on the housing.

DETAILED DESCRIPTION OF THE PREFERRED EMBODIMENTS

Temperature Measurement Systems

Figure 1:
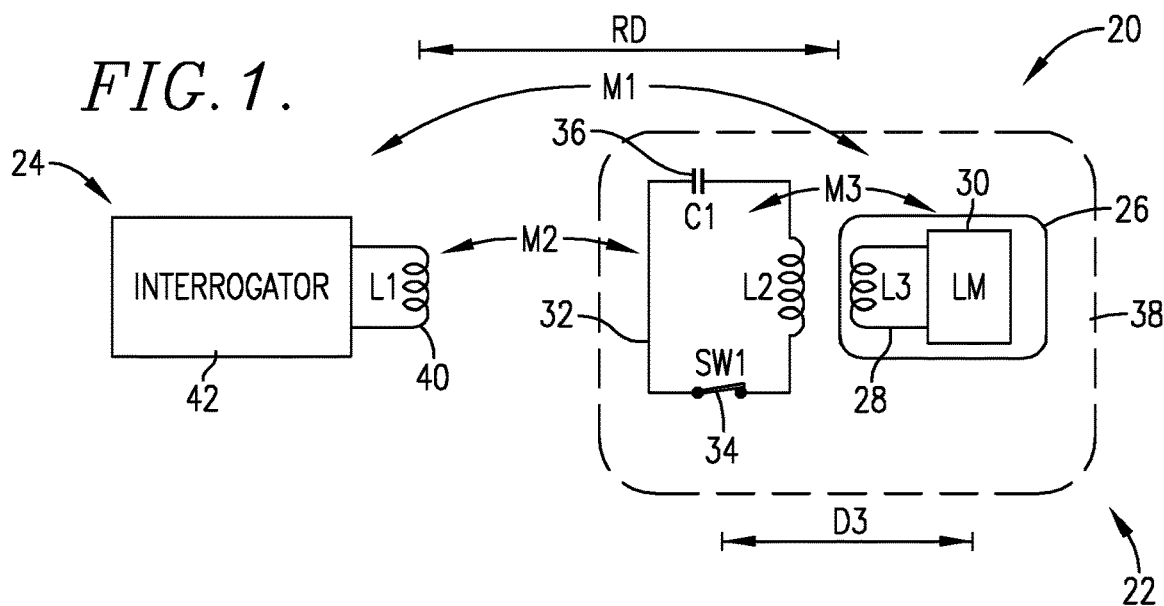
FIG. 1 is a schematic illustration depicting a temperature measurement system in accordance with the invention including an electromagnetic transponder and a separate impedance-changing parasitic antenna having a single thermal switch in the closed position thereof.

Turning now to the drawings, FIG. 1, an exemplary temperature measurement system 20 is illustrated, which broadly includes a temperature sensor 22 and an interrogator 24. The sensor 22 is designed to be placed in effective thermal contact with an object whose temperature is to be sensed, whereas the interrogator 24 is a separate component in proximity to the sensor 22.

The preferred sensor 22 includes a transponder, here in the form of RFID tag 26, advantageously a UHF Tagsys AK5, which has the ability to be read and written, with 160 reprogrammable bits and 96 identification bits. The tag 26 has an antenna 28 of self-inductance L3 and a microcircuit 30 (labeled LM) coupled with antenna 28 and operable to extract energy from the antenna and to generate and convey a reply signal to the antenna 28, or alternately to another antenna (not shown). Additionally, the sensor 22 has a separate parasitic antenna 32 having a characteristic impedance value, a self-inductance L2, a thermal (e.g., bi-metallic) switch 34 (labeled SW1), and a tuning capacitor 36 (labeled C1). The sensor components 26 and 32 are preferably mounted upon a substrate 38, such as a circuit board or the like, with a fixed distance D3 between these components. Importantly, the parasitic antenna 32 is placed in thermal contact with the object to be temperature-sensed.

The interrogator 24 includes an antenna 40 having self-inductance L1, operably coupled with a transmitter/receiver 42. The interrogator 24 is operable to successively interrogate sensor 22 during operation of the system 20 and to decode reply signals from sensor 22. The interrogator 24 is placed at a reading distance RD relative to the sensor 22.

Referring to FIG. 1, it is useful to describe the main components of the temperature measurement system 20 and their electromagnetic interactions to further explain the effect of the impedance-changing parasitic antenna 32. The system 20 uses electromagnetic communications in which the interrogator 24 containing a transmitter/receiver 42 generates electromagnetic signals which are transmitted via interrogator antenna 40 to RFID tag 26 containing antenna 28. The RFID antenna 28 receives a portion of the transmitted energy from antenna 40 and, through a rectifier forming a part of microcircuit 30, generates DC power which is used for operation of a reply generation circuit, connected to the antenna 28. The result is that information-bearing electromagnetic reply signals are transmitted from tag 26 back to the receiver of the interrogator 24. One path of information transfer between interrogator 24 and tag 26 is the electromagnetic coupling path represented by mutual inductance M1 of FIG. 1.

The antenna 42 of interrogator 40 and antenna 28 of tag 26 take the form of loops of self-inductance L1 and L3. The principal form of direct coupling between such inductive loops is provided by reactive energy storage fields surrounding these antennas and is expressed in terms of the mutual inductance M1, between these loops. During transmissions from interrogator 24 to tag 26, the interrogator antenna 40 excites the tag antenna 28 over an electromagnetic coupling path represented by the mutual inductance M1. The microcircuit 30 extracts energy from the excited tag antenna 28, and generates tag reply signals (or more generally, transponder reply signals), and conveys such tag reply signals to tag antenna 28 or perhaps to some separate label antenna not shown. During transmissions from tag 26 back to interrogator 24, the tag reply signals excite the interrogator's antenna 40 via the same electromagnetic coupling path M1.

Again referring to FIG. 1, a second path of information transfer between interrogator 24 and tag 26 is illustrated. This second path comprises the individual electromagnetic coupling paths between parasitic antenna 32 and both the interrogator 24 and tag 26. Specifically, an electromagnetic coupling path represented by the mutual inductance M2 couples parasitic antenna 32 having self-inductance L2 tuned by capacitor 36, with interrogator antenna 40 having self-inductance L1. The current which circulates in the parasitic antenna 32 also excites tag antenna 28 over an electromagnetic coupling path represented by mutual inductance M3 between parasitic antenna 32 and tag 26 having self-inductance L3. Thus, during intended transmissions from interrogator 24 to tag 26, communication between interrogator 24 and tag 26 via the second information path occurs indirectly—the interrogator 24 excites the parasitic antenna 32, which in turn excites the tag 26. Once the tag 26 generates tag reply signals, the latter signals excite the parasitic antenna 32, which generates parasitic reply signals bearing the same information contained in the tag reply signals. The parasitic antenna reply signals then excite the interrogator antenna 40, and the communication between RFID tag 26 and interrogator 24 is complete. It should be noted that the parasitic antenna 32 need not be configured as a closed loop, but rather must simply provide electromagnetic coupling paths between itself and both the tag 26 and interrogator 24. All types of parasitic antennas providing inductive coupling paths that are disclosed in U.S. Pat. No. 6,172,608 are usable for this invention, in lieu of the specific antenna embodiments described herein.

This invention makes use of the fact that the strength of the second electromagnetic coupling path represented by M2 and M3 can be altered by changing the impedance of the parasitic antenna 32 at one or more pre-set temperatures. FIG. 1 depicts one method of changing the parasitic antenna impedance, by employing a thermal switch 34 along the conducting path of the parasitic antenna 32. When the thermal switch 34 is closed, the electromagnetic coupling paths shown by M2 and M3 are strong. Thus, the information from the tag reply signals, conveyed via the parasitic antenna reply signals, is received by the interrogator antenna 40. When switch 34 is closed, the maximum reading distance (the maximum distance between interrogator antenna 40 and temperature sensor 22 over which the information contained in the tag reply signals can be repeatedly received by interrogator antenna 40 and successfully decoded) is large value A. However, when the temperature of thermal switch 34 (or that portion of an object in thermal contact with it) is above or below its pre-set temperature, the switch will open and remain open. In this state, the impedance of the parasitic antenna 32 is greatly changed and the electromagnetic coupling paths M2 and M3 are severely reduced in strength. As such, the parasitic antenna reply signals may be no longer received at the distance A between interrogator 24 and temperature sensor 22. Depending upon the degree of reduction of the strengths of the electromagnetic coupling paths M2 and M3, the tag reply signals may be received at a greater reading distance via electromagnetic coupling path M1 than the corresponding information received via paths M2 and M3. In either case, the maximum reading distance with the thermal switch 34 open will be a fraction of value A. If the distance RD has not changed during the temperature measurements (interrogations looking for reply signals), the sudden loss of reply signal after the thermal switch 34 opens is discerned by the interrogator's logic as a thermal switch temperature above or below its pre-set switching temperature.

In use, the sensor 22 is operatively coupled with an object to be temperature-sensed, typically by application of the substrate 38 to the object so that switch 34 is in thermal contact with the object. Alternately, the tag 26 and parasitic antenna 32 may be separated, so long as the distance therebetween permits effective electromagnetic communication. In all preferred forms of use, however, the distance between the tag 26 and antenna 38 is fixed during use, as is the distance between the interrogator 24 and the sensor 22.

In the ensuing discussion, the description of the invention will focus on systems used during the heating of an object. However, it should be understood that the systems could equally be used when an object is being cooled.

The switch 34 of sensor 22 is designed to actuate when a predetermined object temperature is sensed, for example, during heating of the object. When the object temperature is below the predetermined temperature, the strengths of the electromagnetic couplings represented by M2 and M3 are strong and substantially constant so that the reply signals received by antenna 40 over paths M2 and M3 are of sufficient magnitude to be decoded by interrogator 24. However, when the object reaches and/or exceeds the predetermined temperature, the switch 34 operates (typically by opening) to greatly increase the impedance value of parasitic antenna 32. This in turn greatly reduces the strengths and magnitudes of the electromagnetic coupling paths M2 and M3. Correspondingly, the reply signals from the sensor 22 may no longer be received by the interrogator 24, or are of greatly reduced magnitude, which is interpreted by the interrogator as a condition where the object has reached or is above the predetermined temperature. Hence, it will be appreciated that the switch 34 serves as a temperature-sensitive transducer operable to selectively change the impedance value of the parasitic antenna 32.

The function of temperature sensor 22 is maximized when the relative positions of the tag 26 and parasitic antenna 32 are fixed during temperature measurements. If this fixed relative relationship is maintained, then the distance between the antenna 40 of interrogator 24 and parasitic antenna 32 can be selected such that the interrogator will successfully receive the reply signal information from sensor 22 via the parasitic antenna reply signals when the object is below the pre-set temperature, but will not successfully receive the parasitic antenna reply signals when the object is at or above the pre-set temperature. Referring to FIG. 1, if the parasitic antenna-RFID tag distance is D3, and the relative orientations of the parasitic antenna 32 and tag 26 are fixed, the maximum reading distance is the distance A. Therefore, if the distance between interrogator 24 and sensor 22 is less than or equal to A, the interrogator 24 will successfully receive tag reply signal information when the object is below the pre-set temperature. By the same token, once the impedance value of the parasitic antenna 32 changes significantly at or above the pre-set temperature, the antenna 40 of interrogator 24 will no longer receive the tag reply signal information via the parasitic reply signal (or from the tag reply signal itself via the path represented by MD. In fact, maximum reading distance upon this impedance value change will be reduced by a factor B to a value A/B, which is typically in the range of about 5-10. Consequently, as long as the maximum reading distance is chosen to be a distance greater than A/B, then tag reply signal information will be successfully received when the object, and thereby parasitic antenna 32, is below the pre-set temperature, and will not be received when a least a portion of the antenna 32 is at or above the pre-set temperature. Of course, the interrogator 24 is programmed to deduce the following: During the course of a continual interrogation of sensor 22, so long as parasitic reply signals are received from sensor 22, the object is below the pre-set temperature, whereas unsuccessful receipt of label signals means that at least some portion of the object in thermal contact the antenna 32 is at or above the pre-set temperature.

Figure 2:
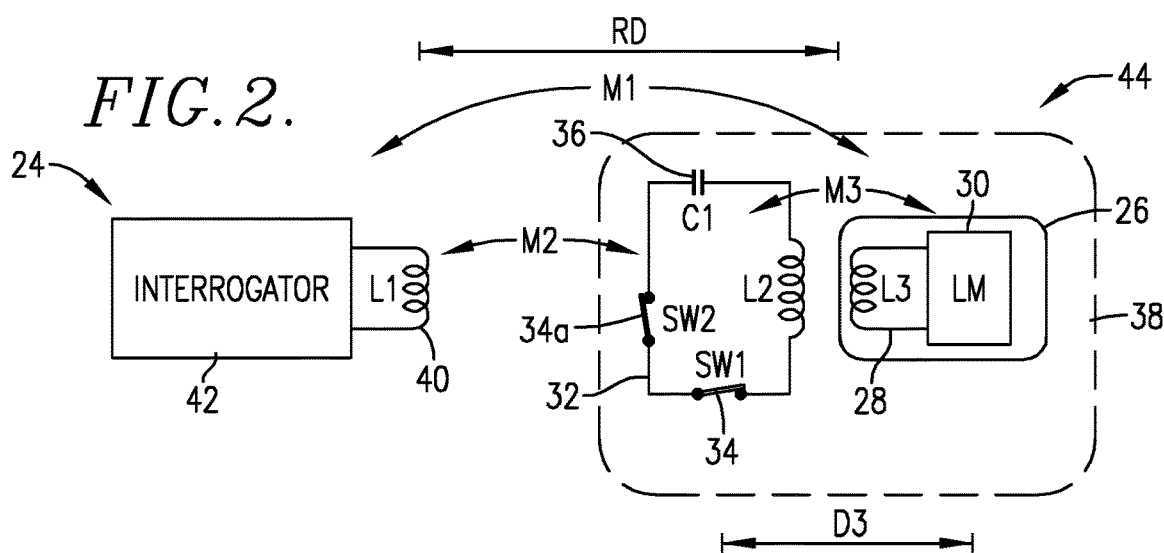
FIG. 2 is schematic illustration depicting another temperature measurement system in accordance with the invention wherein the parasitic antenna has multiple thermal switches shown in the closed positions thereof.

FIG. 2 illustrates another embodiment of the invention in the form of a temperature-measuring system 44. The system 44 is identical with the system 20, save for the fact that the parasitic antenna 32 includes a pair of thermal switches 34 and 34a (labeled SW1 and SW2, respectively). Accordingly, the components of system 44 identical with those of system 20 have been labeled with identical reference numerals.

The thermal switches 34, 34a may be set to open or close upon a predetermined temperature change of the sensed object. Inasmuch as the switches 34, 34a are designed to be in thermal contact with the object, it is possible that the body is not isothermal and thus the switches could be set at different predetermined temperatures. Thus, the purpose of the system 44 is to determine when at least one of two critical regions of the object reach a pre-set temperature for the region. Of course, more than two thermal switches may also be used. Once the first of multiple thermal switches opens at its predetermined temperature, the reply signal from the tag 26 would no longer be received by interrogator 24, and the logic of the interrogator would deduce that at least one of the thermal switches had reached its predetermined temperature.

Figure 3:
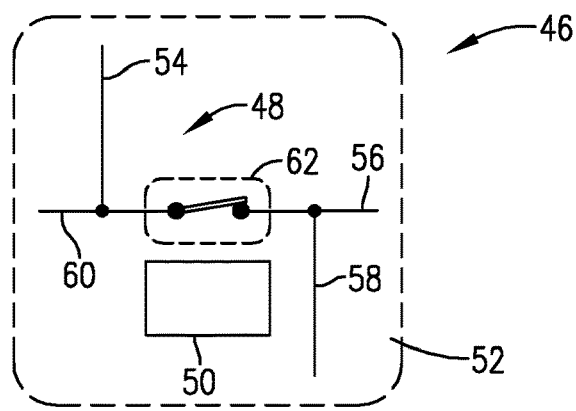
FIG. 3 is a schematic depiction of a preferred transponder employing a UHF RFID tag and a separate parasitic antenna with a single bi-metallic thermal switch.

An alternate version of a single-temperature, single sensing location, impedance changing temperature sensor 46 of this invention is illustrated in FIG. 3. The sensor 46 includes a parasitic antenna 48 and a separate RFID tag 50, both mounted on a substrate 52. The antenna 48 includes elements 54, 56, 58, and 60. A thermal switch 62 interconnects the ends of elements 56 and 60, whereas element 54 is electrically connected with element 60 and element 58 is electrically connected with element 56. The switch 62 has a pre-set switching temperature which is chosen to achieve a desired regulation temperature. The elements 54-60 are electrically conducting paths, preferably formed of lengths of shielded copper wire of 26 gauge, and form a staggered pattern with the switch 62 at the approximate center of the pattern. The lengths of the elements 54-60 can be adjusted to achieve the desired strength of electromagnetic coupling with the antenna of RFID tag 50, such coupling being represented by the mutual inductance M3 of FIG. 1. When the total length of the elements 54 and 58 is 15 cm, the electrical resistance across these elements from end to end is near 1 Ohm. However, when the switch 62 operates when the sensed object reaches the pre-set temperature of the switch, the resistance rises to the mega Ohm range and remains there at temperatures above the pre-set temperature. The antenna 48 thus has a much larger impedance value at or above the predetermined temperature, as compared with the antenna 32 of FIG. 1, so that the coupling paths M2 and M3 are considerably weaker upon operation of switch 62. This results in a reduction in the maximum reading distance for the sensor 46.

Figure 4:
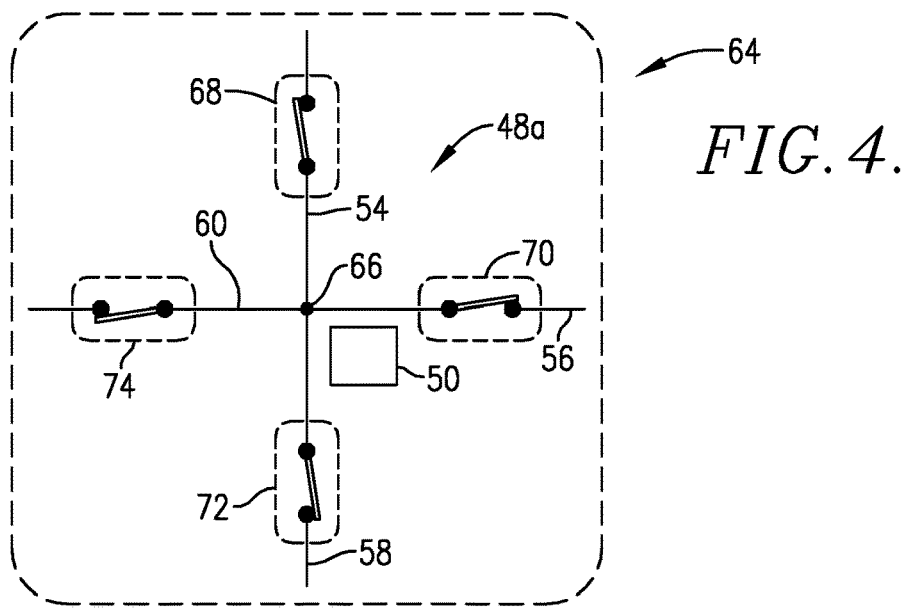
FIG. 4 is a schematic illustration of a transponder including a UHF RFID tag and a separate parasitic antenna with multiple bi-metallic thermal switches.

FIG. 4 illustrates an alternative temperature sensor 64 having multiple sensing locations. The individual components of sensor 64 are similar to those of sensor 46, and thus like reference numerals are used. The sensor 64 includes RFID tag 50 and parasitic antenna 48a having sensor elements 54, 56, 58, and 60, the latter electrically connected at central point 66. The elements 54-60 are of the same material and construction as those of FIG. 3, and the combined length from end-to end of each leg of the resultant X shape is chosen, along with the fixed relative position of RFID tag 50 to achieve desired strength electromagnetic coupling paths M2 and M3 of FIG. 2. In this embodiment, there are four temperature-sensing locations, each being a different location on the object being temperature-sensed, and each in contact with a respective bi-metallic thermal switch 68, 70, 72, and 74. The predetermined temperatures of each of the four switches may be identical or they may be different from each other. As described in connection with sensor 46, the electrical resistance from the end of element 54 to element 58 is near one Ohm when the total length of these elements is 15 cm. This resistance rises into the mega Ohms range at the predetermined temperatures of switch 68 and 72 due to the open circuit that occurs when one or more of these thermal switches opens and remains open. This much larger parasitic antenna impedance at, and at or above one or more predetermined switch temperatures causes the electromagnetic coupling paths M2 and M3 to be vastly weaker, resulting in a reduction in the maximum reading distance for the sensor 64.

Figure 5A:
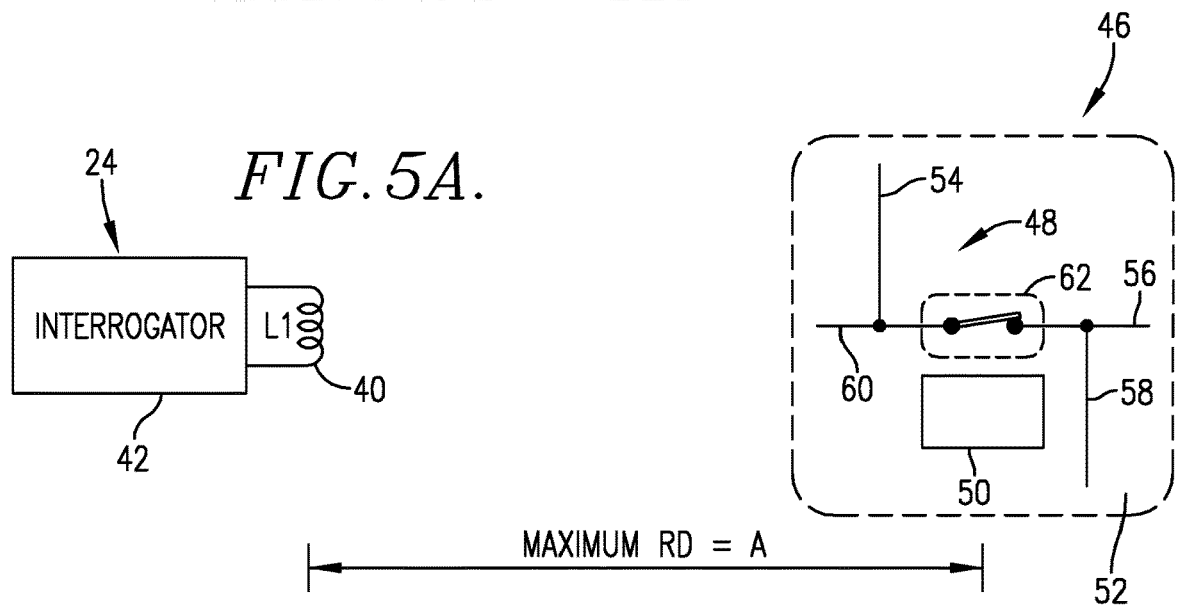
FIG. 5A is a schematic illustration depicting the normal maximum reading distance achieved using the parasitic antenna of FIG. 3, when the thermal switch thereof is in the closed position.
Figure 5B:
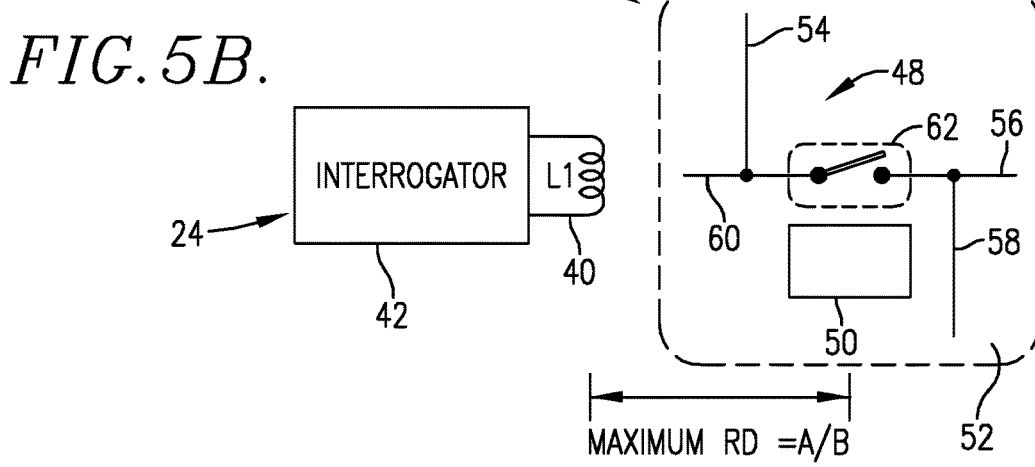
FIG. 5B is a schematic illustration depicting the normal maximum reading distance achieved using the parasitic antenna of FIG. 3, when the thermal switch thereof is in the open position.

The differential in maximum reading distances between the switch states (e.g., switch-closed and switch-open positions) in the systems of the invention is illustrated in FIGS. 5A and 5B. As shown therein, a system employing interrogator 24 and sensor 46 is depicted in these figures, with the switch 62 being closed in FIG. 5A. In this configuration, the maximum reading distance RD is indicated by the distance arrow and is denominated as distance A, as previously discussed in connection with FIG. 1. However, when the switch 62 opens as a result of the sensed object reaching the predetermined temperature for the switch, the maximum reading distance RD is substantially reduced, by a denominator factor B, resulting from the very significant change in impedance for the antenna 48 incident to switch opening.

Figure 6:
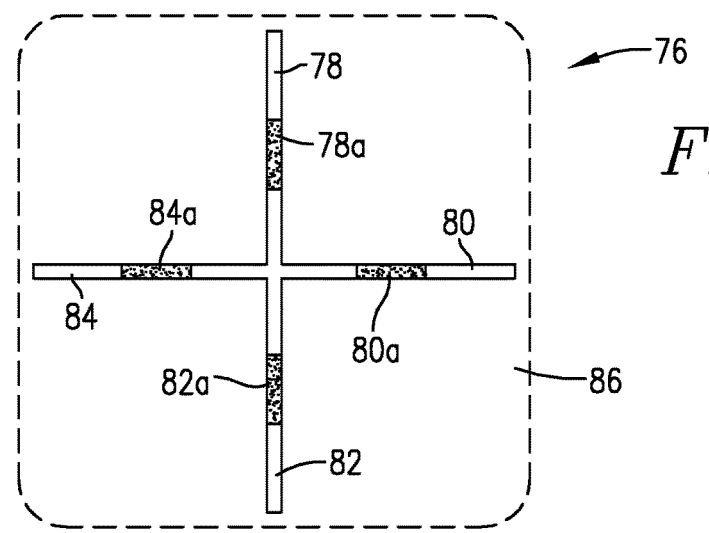
FIG. 6 is a schematic illustration of a parasitic antenna comprising conducting traces formed on or within a circuit board and having multiple short sections along the traces made of Positive Temperature Coefficient ink.

Another type of parasitic antenna 76 is illustrated in FIG. 6. This antenna includes electrically connected conductive traces 78, 80, 82, and 84 mounted on a substrate 86 in an X-shaped pattern. These traces are formed of low resistivity conducting material, such as silver or copper. Preferably, the traces 78-84 are deposited or printed on substrate 86 using a silver ink, such as EC 1010 from Loctite. Each trace also includes a central section 78*a*, 80*a*, 82*a*, and 84*a*, respectively, which is electrically connected to the associated trace, and is formed using positive temperature coefficient ink (ECI 8001 from Loctite), likewise deposited or printed onto the substrate. The electrical resistance of each section 78*a*-84*a* increases in a stepwise fashion from approximately 10 Ohms to 80 Ohms at a pre-set temperature. Hence, the resistance as measured from the end of trace 78 to the end of segment 82 (and likewise from the end of segment 80 to the end of segment 84) is approximately 20 Ohms at a predetermined temperature, but rises to 160 Ohms at a temperature above the predetermined temperature. Therefore, when at least one of the sections 78*a*-84*a* senses the predetermined operational temperature, there is a substantial rise in electrical resistance which correspondingly increases the impedance value of antenna 76, leading to a significant reduction in the electromagnetic coupling paths M2 and M3. It will be appreciated that this embodiment makes use of a different type of temperature-sensitive transducer, namely the ink sections 78*a*-84*a*.

Use of the Temperature Measurement Systems in Food Service Servingware Domes

As indicated previously, the temperature measurement systems of the invention have wide applicability and can be used in a variety of contexts. One such use is with food servingware domes, which can be placed over a food-bearing plate in order to maintain the temperature of the food. Such domes are commonly used in institutional food situations, such as in hospitals or banquet rooms.

Figure 7:
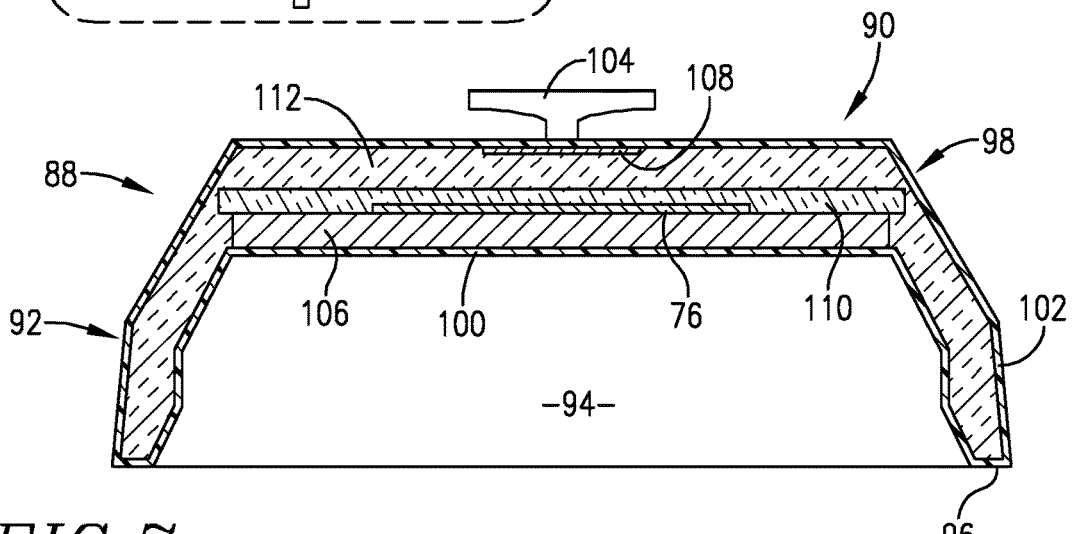
FIG. 7 is a vertical sectional view of an insulated dome for use with a food servingware plate in order to maintain the temperature of food on the plate, including the parasitic antenna of FIG. 6.
Figure 8:
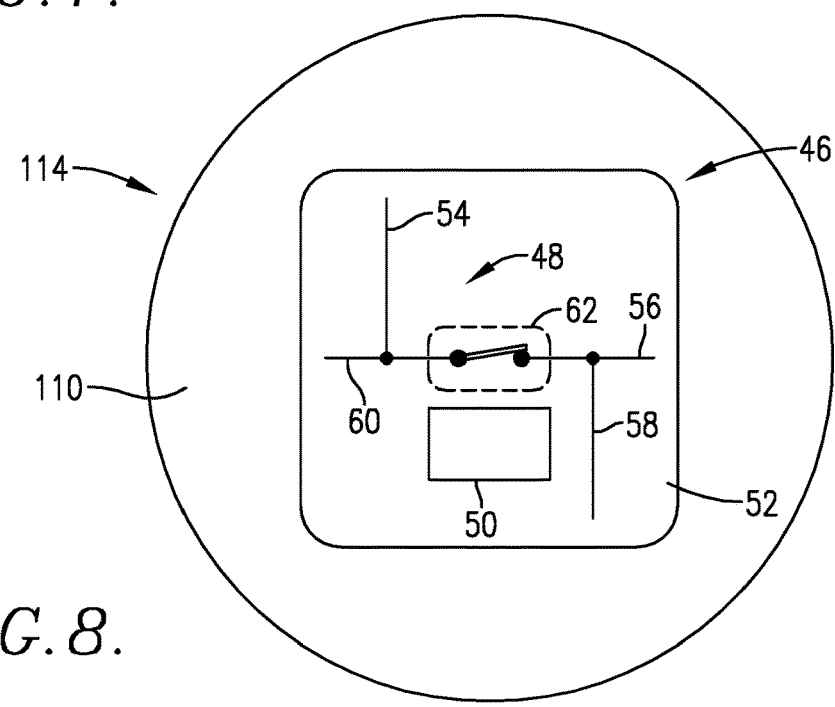
FIG. 8 is a partial horizontal sectional view of an insulated dome of the type depicted in FIG. 7, but illustrating the use of the sensor shown in FIG. 3.

Attention is directed to FIGS. 7 and 8, which illustrate such a servingware dome 88. The dome 88 has a central section 90 with a peripheral, outwardly and downwardly extending skirt section 92 thereby defining a central concavity 94. The bottom edge 96 of skirt section 92 is designed to rest upon or encircle a food-bearing plate (not shown). The section 90 and skirt 92 are formed within a polymeric shell 98 including an inner shell layer 100 and an outer shell layer 102. A central handle 104 extends upwardly from outer shell layer 102, as shown.

Internally, the dome has an induction-heatable laminated matrix plate 106 in direct thermal contact with inner shell layer 100. This matrix plate 106 is preferably formed of material described in U.S. Pat. No. 6,657,170, entitled "Heat Retentive Inductive Heatable Laminated Matrix," which is incorporated by reference herein in its entirety. Generally speaking, the matrix plate 106 comprises a plurality of induction-heatable layers sandwiched between alternating layers of heat retentive material. Preferably, the induction-heatable layers are formed of graphite, whereas the heat-retentive layers are formed of solid-to-solid phase change material, such as radiation cross-linked polyethylene. In alternate forms, use may be made of a metal plate formed of ferromagnetic materials, in lieu of or in addition to the matrix plate 106.

An RFID tag 108 is located directly beneath the outer shell layer 102 below handle 104, and is adhered thereto by silicon adhesive. The tag 108 is preferably the previously described Tagsys AK5. A parasitic antenna 76 (FIG. 6) is positioned in direct contact with the upper surface of matrix plate 106, so that the sections 78*a*-84*a* are thermally coupled with the plate 106. A layer 110 of insulation is positioned over the antenna 76 and is preferably formed of fibrous aerogel insulation material, such as Pyrogel® XT-E produced by Aspen Aerogel, but may be formed of any other high temperature insulative material. Insulative material 112 fills the remainder of the dome structure, and is preferably a high temperature injectable foam, such as urethane.

FIG. 8 illustrates another dome embodiment 114 making use of the sensor 46 of FIG. 3. As illustrated, the sensor 46 is in contact with insulative layer 110 and is sandwiched between the layer 110 and the induction-heatable matrix plate 106 (not shown in FIG. 8), so that the switch 62 is in thermal contact with the matrix plate 106.

Induction Heating Apparatus for the Servingware Domes

Figure 9:
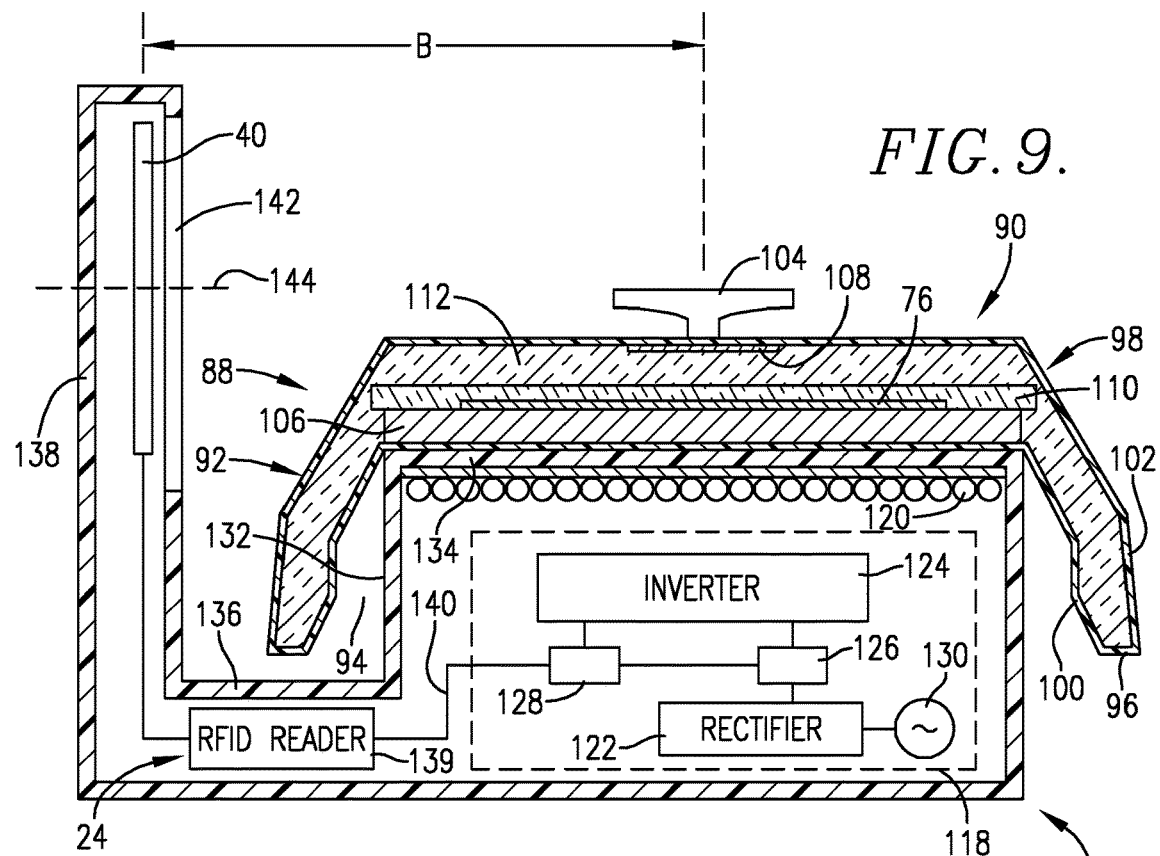
FIG. 9 is a schematic, vertical sectional view of the dome of FIGS. 7-8, when placed upon an induction heater for heating thereof.
Figure 10:
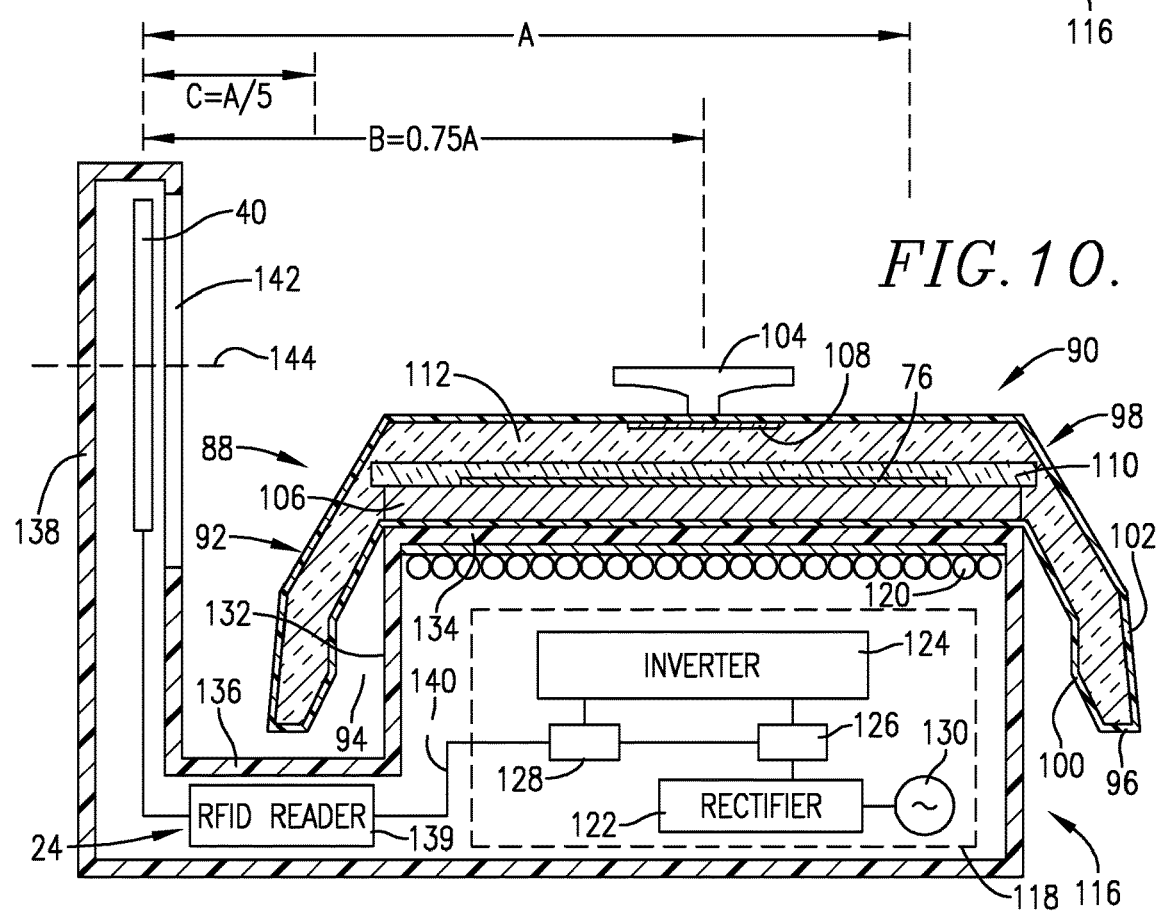
FIG. 10 is a schematic view similar to that of FIG. 9, and illustrating the reading distances for the open and closed states of the parasitic antenna carried by the dome, corresponding to a dome temperature below a pre-set value and above a pre-set value.
Figure 11:
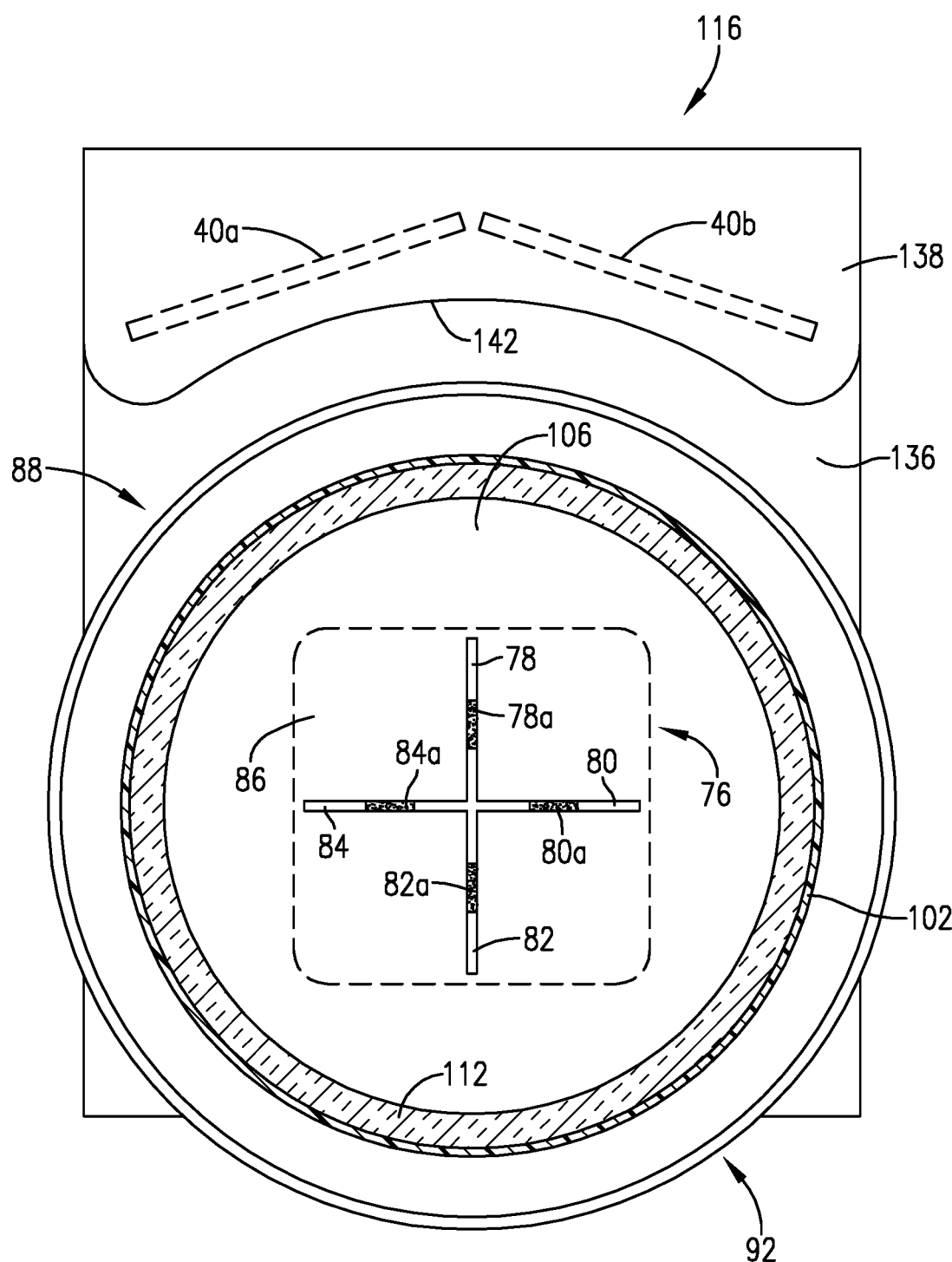
FIG. 11 is a schematic top view in partial horizontal section illustrating the dome of FIGS. 9-10 mounted on an induction heater and illustrating use of a pair of interrogator antennas.

The dome 88 or 114 is heated prior to use thereof, by means of an induction heating apparatus 116 illustrated in FIGS. 9-11. As illustrated, the dome 88 is positioned atop the apparatus 116 for heating, and is removed for use when the induction-heatable matrix plate 106 reaches a predetermined temperature.

Turning to FIG. 9, the apparatus 116 includes an induction heater 118 and its associated work coil 120, preferably of the type described in U.S. Pat. No. 6,320,169, incorporated by reference herein in its entirety. The heater 118 has a rectifier 122, inverter 124, an abnormal load detection system 126, and control microprocessor 128. The heater components receive power from an external power source 130. The heater 118 is located within an upright cylindrical housing 132 with work coil 120 adjacent the top wall 134 of the housing. This allows the dome 114 to be located within the central section 90 thereof resting on the wall 134, and with skirt section 92 positioned about the housing 132.

The housing 132 includes a laterally projecting section 136 and an upstanding antenna section 138. An interrogator 24, here in the form of an RFID reader 139, is located with housing section 136 and is electrically connected with microprocessor 128 via lead 140. The RFID reader 139 is preferably a ThingMagic Micro LTE Reader having two antenna ports and capable of transmitting at up to +30 dBm.

The interrogator/RFID antenna 40 preferably includes two separate antennas 40a and 40b (FIG. 11) located within the antenna section 138 and operably coupled with the RFID reader 139. The upright antenna section 138 has an inner face section 142 proximal to housing 132 formed of non-conducting material, such as a synthetic resin polymer or ceramic, so as to not affect the RF transmissions between the antennas 40a, 40b and the antenna 76 and RFID tag 108. Also, the mid-plane 144 of the antennas 40a and 40b should be on the same level or higher than the plane of RFID tag 108.

The distance B between the center of the temperature-sensing structure of dome 90 (comprising both the RFID tag 108 and antenna 76) and the vertical center line of the antennas 40a and 40b should be less than the maximum reading distance A illustrated in FIG. 5A. Preferably, the distance B is set at 0.75×A, where A can be adjusted by the output power of the RFID reader 139. This is because the physical parameters affecting the mutual inductances M1, M2, and M3 are set by the fixed relative positions of the RFID tag 108 and parasitic antenna 76, as well as the fixed position of these components relative to the antennas 40a, 40b.

Operation of the Induction Heating Apparatus to Heat a Servingware Dome

FIG. 10 illustrates a dome 88 properly positioned atop induction heater 118 for heating of the dome. Such proper positioning is achieved by two complementary aspects of the design of the induction heating apparatus 116. First, the mechanical fit of the dome 88 over the cylindrical housing 132 properly centers the dome. This is important because, should the dome 88 be placed off-center, the induction-heatable plate 106 would be at a greater average distance from work coil 120 than is shown in FIG. 10. This greater average distance would cause the coupling between the work coil 120 and the matrix plate 106 to be lower than is required for the abnormal load detection system 126 to allow for continuous production of an alternating magnetic field by the apparatus 116. Second, the control microprocessor 128 will not allow continuous production of the alternating magnetic field unless the mid-plane 144 of the antennas 40a, 40b is above the plane of RFID tag 108, and the geometric center of the dome temperature sensor is less than the maximum reading distance A.

Once the dome 88 is properly positioned as in FIG. 10, the induction heating may commence. First, the microprocessor 128 will need to satisfy two conditions before it will permit continuous production of an alternating magnetic field to begin induction heating. It will first need to determine that the load provided by the dome is within the allowable load conditions for the abnormal load detection system 126. Second, it will need to determine that a valid reply signal from the RFID tag 108 has been received by RFID reader 139. The transmission and receipt of a signal to/from the tag 108 is preferably done prior to any induction work coil-produced magnetic field used to detect a load present on the apparatus 116.

When the two microprocessor conditions are met, the induction heater will produce a continuous alternating magnetic field for a pre-set duration to begin heating the dome 88 by virtue of the induction heating of matrix plate 106. After this pre-set duration is complete, the induction heater's microprocessor will cause the current flowing through the induction heater's work coil 120 to temporarily cease, during which time it will cause the RFID Reader 139 to transmit to the RFID tag 108. If all portions of the dome's induction-heatable matrix plate 106 are at a lower temperature than any of the parasitic antenna's PTC sections 78a-84a pre-set temperatures, then the RFID Reader 139 will receive reply signals. In this case, the maximum read range of the temperature measurement system of this invention will be the value A. Since B is 0.75×A, the reply signals will be received. The successful receipt of reply signals, as well as the proper load being detected (i.e., the dome is not off-center), will allow the resumption of generation of the continuous magnetic field. Again, after another pre-set duration, this process will be repeated. The pre-set duration time is preferably two (2) seconds and the "off time" for RFID transmissions is preferably 50 milliseconds.

As this heating process continues, eventually one of the parasitic antenna's PTC sections 78a-84a will exceed its pre-set temperature. When this occurs, the impedance of the parasitic antenna 76 will drastically increase and will cause the inductive coupling paths represented by M2 and M3 of FIG. 1 to become much weaker. The combined path represented by the combination of M2 and M3 may become weaker than the inductive coupling path represented by M1 of FIG. 1. In any case, the weakened inductive coupling paths at this high temperature of the inductive heatable matrix plate 106 (and thus parasitic antenna 76) will reduce the maximum reading distance to a value C, as shown in FIG. 10. As a result, the reader 139 will not receive reply signals of the same magnitude as before (or will not receive any signals whatsoever), and this will be interpreted as a condition where the plate 106 of dome 88 has reached or exceeds one of the pre-set temperatures of antenna 76. Therefore, the microprocessor 128 will stop the generation of a continuous magnetic field from work coil 120.

It is preferable to design the temperature sensor of the dome 88 to make C equal a value of A/5. This will ensure that, during the next "off time" the RFID Reader 139 will not receive a reply response from the RFID tag 108. In such a case, one of the two necessary conditions for allowing a continuous production of magnetic field will not be achieved and the induction heater will not produce a continuous magnetic field. Instead, it will periodically continue to search for a reply signal from the RFID tag 108. No heating of the dome will occur during this time.

To prevent a "bad read" condition from being misinterpreted by the induction heater's microprocessor as a dome above the pre-set temperature, multiple read attempts (multiple, independent transmissions to search for a tag) can be made during the "off times."

Eventually, the induction-heatable matrix plate 106 will fall in temperature such that the impedance of the parasitic antenna 76 changes back to the below-pre-set temperature value, such that the coupling path represented by M2 and M3 is strong enough such that the maximum reading range is again A. At this point, the induction heating of the dome will resume until the pre-set temperature is again exceeded. In this way the temperature of the induction-heatable element of the dome can be regulated about the pre-set temperature.

While the operation of apparatus 116 has been described in connection with the dome 88 having the separate RFID tag 108 and parasitic antenna 76, different types of transducers may be used, such as the thermal switch transducer 62 of FIG. 3. Also, the induction heater's magnetic field may not need to be interrupted during RFID tag communications.

While the described embodiments of the invention make use of inductive coupling, the invention is not so limited. All types of parasitic antennas providing various types of coupling paths that are disclosed in U.S. Pat. No. 6,172,608, which is hereby incorporated by reference, are usable for this invention, in lieu of the specific antenna embodiments described herein. Such coupling paths can be achieved, for instance, by mutual inductance or by enhanced electromagnetic field production in the vicinity of the transponder.

We claim:

1. An assembly, comprising:
 a magnetic induction heater comprising an upstanding housing having a sidewall and a top wall, and a work coil within the housing and operable to generate an alternating magnetic field; and
 a servingware dome including a body presenting a central section and a peripheral skirt depending from said central section, said central section and said skirt dimensioned to engage with said housing and prevent any substantial lateral movement of the dome, said central section having an induction-heatable component therein,
 said dome removably positioned on said heater with said central section adjacent said housing top wall and with said skirt adjacent said sidewall, so that operation of said work coil will inductively heat said component,
 said dome central section having a temperature sensor including—
 a transponder including a transponder antenna and a circuit operably coupled with the transponder antenna, said circuit operable to extract energy from electromagnetic signals received by said transponder antenna, and to generate transponder reply signals containing reply information; and
 a parasitic antenna having an impedance value and operable to be excited by said transponder reply signals in order to generate parasitic antenna reply signals containing said reply information,
 said transponder antenna and said parasitic antenna being in proximity and electromagnetically coupled when said electromagnetic signals are received,
 said parasitic antenna including a temperature-sensitive transducer operable to change the impedance value of the parasitic antenna when said component reaches a predetermined temperature, to thereby change a detectable parameter of said parasitic antenna reply signals.

2. The assembly of claim 1, said temperature-sensitive transducer of said parasitic antenna being thermally coupled with said induction-heatable component in order to sense the predetermined temperature of the component.

3. The assembly of claim 1, said induction-heatable component comprising a matrix having a plurality of induction-heatable layers sandwiched between alternating layers of heat-retentive material.

4. The assembly of claim 1, said transducer selected from the group consisting of a temperature-sensitive switch, an electrically conductive trace formed of positive temperature coefficient ink, and combinations thereof.

5. The assembly of claim 1, said transponder antenna and said parasitic antenna operable to receive interrogating electromagnetic signals.

6. The assembly of claim 1, said parasitic antenna including a plurality of temperature-sensitive transducers, each operable to change the impedance value of the parasitic antenna at different predetermined temperatures, respectively.

7. The assembly of claim 1, said detectable parameter comprising a magnitude of said parasitic antenna reply signals.

8. The assembly of claim 1, said transponder and parasitic antenna being mounted on a common substrate.

9. The assembly of claim 1, said transponder antenna and said parasitic antenna being coupled by mutual inductance.

10. The assembly of claim 1, the distance between said transponder and parasitic antenna being fixed.

11. The assembly of claim 1, said housing being substantially cylindrical in shape such that the top wall and the sidewall fit within and engage with said dome when said dome is positioned for induction heating.

12. An assembly comprising:
 a magnetic induction heater comprising an upstanding first housing having a sidewall and a top wall, and a work coil within the first housing and operable to generate an alternating magnetic field;
 a servingware dome including a body presenting a central section and a peripheral skirt depending from said central section, said central section having an induction-heatable component therein,
 said dome removably positioned on said first housing, with said central section adjacent said first housing top wall and with said skirt adjacent said sidewall, so that operation of said work coil will inductively heat said component,
 said central section having a wireless temperature sensor operable to generate an electromagnetic signal when said temperature sensor reaches a predetermined temperature; and
 an interrogator assembly operably coupled with said temperature sensor and positioned in a second housing laterally spaced relationship to said first housing, said second housing comprising a region of non-conducting material proximate said interrogator assembly and said wireless temperature sensor when said dome is positioned on said first housing, said interrogator assembly operable to interrogate said temperature sensor and to receive said electromagnetic signal from the temperature sensor, said interrogator assembly including an antenna operable to receive said electromagnetic signal.

13. The assembly of claim 12, said interrogator assembly including an interrogator and a RFID antenna.

14. The assembly of claim 12, said temperature sensor comprising:
 a transponder including a transponder antenna and a circuit operably coupled with the transponder antenna, said circuit operable to extract energy from electromagnetic signals received by said transponder antenna, and to generate transponder reply signals containing reply information, said transponder antenna operably coupled with said interrogator assembly; and
 a parasitic antenna having an impedance value and operable to be excited by said transponder reply signals in order to generate parasitic antenna reply signals containing said reply information,
 said transponder antenna and said parasitic antenna being in proximity and electromagnetically coupled when said electromagnetic signals are received,
 said parasitic antenna including a temperature-sensitive transducer operable to change the impedance value of the parasitic antenna in the event that said component reaches a predetermined temperature, to thereby change a detectable parameter of said parasitic antenna reply signals.

15. The assembly of claim 12, said interrogator assembly antenna elevated within said second housing and proximate said region of non-conducting material.

* * * * *